(12) United States Patent
Sakayanagi et al.

(10) Patent No.: US 10,479,393 B2
(45) Date of Patent: Nov. 19, 2019

(54) STEERING DEVICE OF VEHICLE

(71) Applicant: AISIN SEIKI KABUSHIKI KAISHA, Kariya-shi, Aichi-ken (JP)

(72) Inventors: Hiroyuki Sakayanagi, Toyohashi (JP); Yoshinori Ishibashi, Hekinan (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 95 days.

(21) Appl. No.: 15/714,154

(22) Filed: Sep. 25, 2017

(65) Prior Publication Data

US 2018/0086362 A1 Mar. 29, 2018

(30) Foreign Application Priority Data

Sep. 27, 2016 (JP) .................................. 2016-188241

(51) Int. Cl.
*B62D 1/185* (2006.01)
*F16C 29/02* (2006.01)
*B62D 1/181* (2006.01)
*B62D 1/184* (2006.01)
*F16F 1/32* (2006.01)
(Continued)

(52) U.S. Cl.
CPC ............. *B62D 1/185* (2013.01); *B62D 1/181* (2013.01); *B62D 1/184* (2013.01); *F16C 29/02* (2013.01); *F16C 29/123* (2013.01); *F16F 1/32* (2013.01); *F16F 3/02* (2013.01)

(58) Field of Classification Search
CPC ........ B62D 1/185; B62D 1/181; B62D 1/187; B62D 1/189; B62D 1/18; B62D 1/184; F16C 29/123; F16C 29/02; F16F 3/02; F16F 1/32

USPC .................................... 280/775; 74/493, 492
See application file for complete search history.

(56) References Cited

U.S. PATENT DOCUMENTS 3,856,242 A * 12/1974 Cook ........................ F16F 1/32
 248/548
6,932,387 B2 * 8/2005 Laisement ............. B62D 1/195
 248/900
9,038,495 B2 5/2015 Morinaga et al.
(Continued)

FOREIGN PATENT DOCUMENTS

JP 2000-280917 A 10/2000
JP 2013-067309 A 4/2013
JP 2013-067313 A 4/2013

*Primary Examiner* — Keith J Frisby
(74) *Attorney, Agent, or Firm* — Buchanan Ingersoll & Rooney PC

(57) ABSTRACT

A steering device of a vehicle, the steering device includes: a column housing supported by a vehicle body; a column tube supported to be movable with respect to the column housing in an axial direction; and a pressing mechanism interposed between the column tube and the column housing to press the column tube. The pressing mechanism includes: an abutment member that abuts against an outer surface of the column tube; a biasing member that is interposed between the abutment member and the column housing so as to bias the abutment member in a direction toward the column tube; and a shim member that is interposed between the biasing member and the abutment member and includes a supporting portion abutting against the biasing member, and a pressing portion abutting against the abutment member in a region shifted from the supporting portion.

8 Claims, 3 Drawing Sheets

(51) Int. Cl.
*F16F 3/02* (2006.01)
*F16C 29/12* (2006.01)

(56) References Cited

U.S. PATENT DOCUMENTS

2013/0074639 A1  3/2013  Toyoda et al.
2015/0090067 A1* 4/2015  Iwakawa ................ B62D 1/181
                                                74/493

* cited by examiner

STEERING DEVICE OF VEHICLE

CROSS REFERENCE TO RELATED APPLICATIONS

This application is based on and claims priority under 35 U.S.C. § 119 to Japanese Patent Application 2016-188241, filed on Sep. 27, 2016, the entire contents of which are incorporated herein by reference.

TECHNICAL FIELD

This disclosure relates to a steering device of a vehicle, and particularly to a steering device capable of adjusting an operation position of a steering wheel in a front-rear direction of a vehicle body.

BACKGROUND DISCUSSION

For example, JP 2000-280917 A (Reference 1), regarding "a steering position adjusting control device that changes a position of a steering wheel in an up-down or front-rear direction" (described in paragraph [0002] in Reference 1), discloses, as a mechanism that "makes a change in a front-rear direction," "a telescopic mechanism, that is, a mechanism that moves a moving column with respect to a fixed column in a front-rear direction in a steering position adjusting device" (described in paragraph [0004] in the same, but, drawing reference numerals are omitted). Then, regarding an embodiment thereof, it is described that "by constantly pressing a radial backlash preventing bushing downward toward a moving column due to a biasing force of a disc spring, the backlash in the radial direction between the moving column and a fixed column is eliminated" (described in paragraph [0018] in the same, but, drawing numbers and drawing reference numerals are omitted).

JP 2013-067313 A (Reference 2) suggests "a steering device of a vehicle which is capable of adjusting at least a steering wheel operation position in a front-rear direction of a vehicle body, that is, a steering device in which a unit of restricting an axial movement of a movable column member with respect to a main housing may be constituted by a small number of parts at a low cost" (described in paragraph [0007] in Reference 2). Then, regarding an embodiment thereof, it is described that "a biasing member of the embodiment includes a steel substrate fixed to end faces of a pair of side wall portions, and a pair of spring members which bias an outer tube toward a bush at positions spaced apart from each other by a predetermined distance in the axial direction with respect to a planar portion of the outer tube. The spring member in the embodiment is formed by stacking a plurality of disc springs, and is arranged so as to press the planar portion of the outer tube via an abutment member made of a synthetic resin and supported by the substrate, and then is fixed to a main housing, thereby applying a desired pressing force to the outer tube" (described in the same paragraph [0031], but, drawing reference numerals are omitted).

By the "radial backlash preventing bushing" described in Reference 1 above or the "biasing member" described in Reference 2 above, a pressing load is applied to the "moving column" or the "outer tube" (both correspond to a "column tube" of this disclosure), and thus a backlash of the column tube in the radial direction may be prevented. However, depending on the structure, the pressing load may be concentrated on the column tube, and it may be difficult to achieve compatibility between securing of sliding property and prevention of backlash of the column tube. With respect to the concentrated load, it becomes necessary, for example, to perform a coating process or the like on the column tube in order to ensure the sliding property while preventing the backlash, thereby causing a cost increase.

Thus, a need exists for a steering device which is not susceptible to the drawback mentioned above. The "fixed column" described in Reference 1 above and the "main housing" described in Reference 2 above correspond to a "column housing" of this disclosure, and the "radial backlash preventing bushing" and the "biasing member" are also called a "telescopic tensioner," but this disclosure uses a "pressing mechanism".

SUMMARY

An aspect of this disclosure is directed to a steering device of a vehicle including: a column housing supported by a vehicle body; a column tube supported to be movable with respect to the column housing in an axial direction; and a pressing mechanism interposed between the column tube and the column housing to press the column tube. The pressing mechanism includes: an abutment member that abuts against an outer surface of the column tube; a biasing member that is interposed between the abutment member and the column housing to bias the abutment member in a direction toward the column tube; and a shim member that is interposed between the biasing member and the abutment member and includes a supporting portion that abuts against the biasing member, and a pressing portion that abuts against the abutment member in a region shifted from the supporting portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
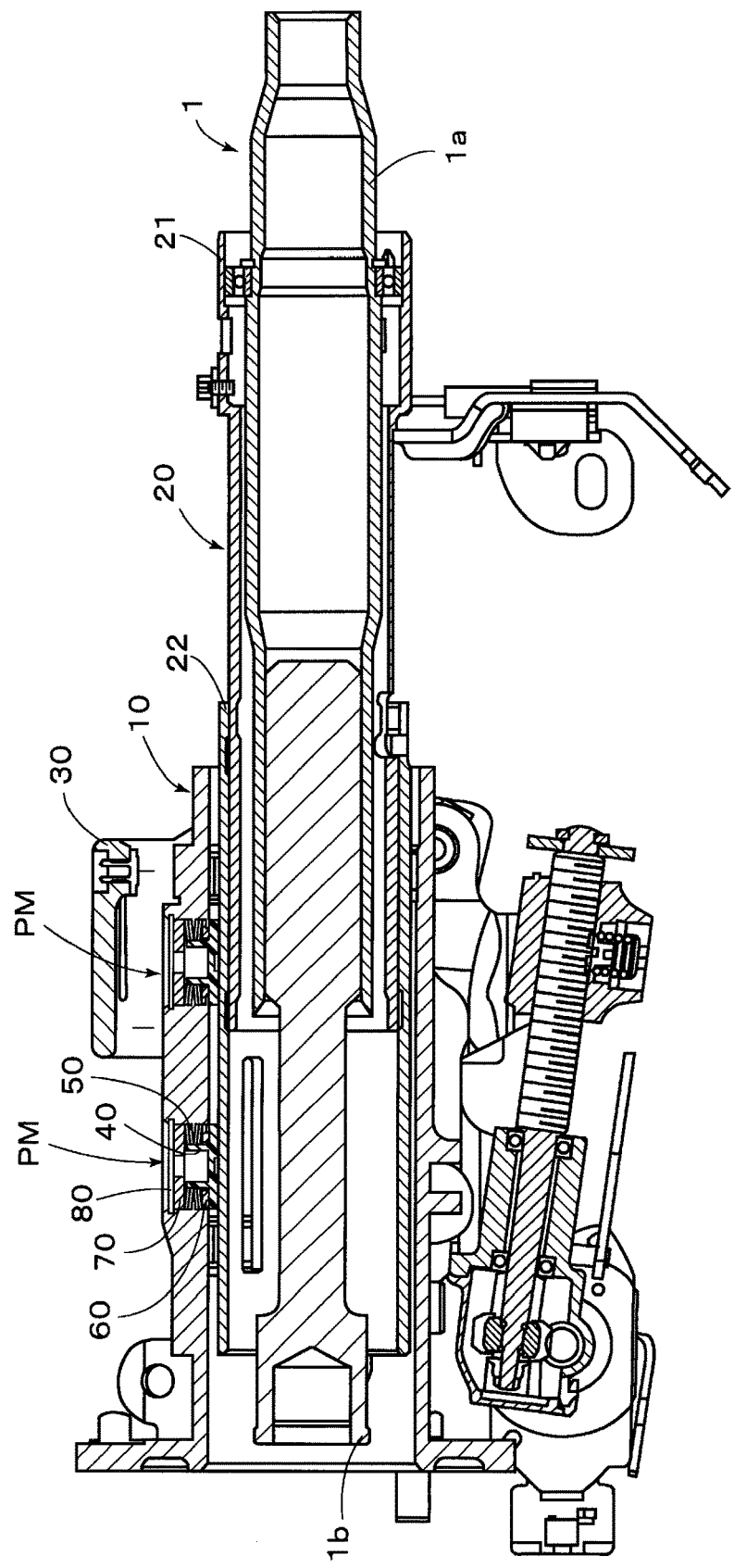
FIG. 1 is a cross-sectional view illustrating the entire steering device according to an embodiment disclosed herein.

Hereinafter, embodiments disclosed herein will be described with reference to drawings. FIG. 1 illustrates the entire configuration of a steering device according to the embodiment disclosed herein. In the embodiment, a steering shaft 1 includes a tubular upper shaft 1a, the rear end portion of which is connected to a steering wheel (not illustrated), and a lower shaft 1b splined to the front end portion of the upper shaft 1a. That is, the upper shaft 1a and the lower shaft 1b are connected to be relatively movable in the axial direction, and the front end portion of the lower shaft 1*b* is connected to a steering mechanism (not illustrated). The steering mechanism is configured to be driven according to the operation of the steering wheel and to steer a steered wheel (not illustrated) via a wheel steering mechanism (not illustrated).

A column housing 10 is arranged coaxially with the steering shaft 1, is swingably supported with respect to a vehicle body (not illustrated), and is held by a fixed bracket 30. The fixed bracket 30 includes a pair of holding portions (the symbol is omitted) extending downward below the vehicle and facing each other, and the column housing 10 is held between the holding portions and fixed to the vehicle body. A pressing member (not illustrated) is interposed between the fixed bracket 30 and the column housing 10, so that the column housing 10 is slidably supported by and pressed against the fixed bracket 30.

Within the column housing 10, a column tube 20 is supported to be movable in the axial direction, that is, movable in the front-rear direction of the vehicle body. As the column tube 20, a metallic inner tube 21 that accommodates the steering shaft 1 and supports the steering shaft 1 to be rotatable around an axis, and a metallic outer tube 22 that accommodates the inner tube 21 and always holds the inner tube 21 at a predetermined position are provided. The upper shaft 1*a* is rotatably supported via a bearing (no symbol is indicated) provided at the rear end portion of the inner tube 21, while a relative movement between the upper shaft 1*a* and the inner tube 21 in the axial direction is inhibited and the upper shaft 1*a* and the inner tube 21 are configured to be integrally movable in the axial direction.

Thus, the outer tube 22, the inner tube 21, the steering shaft 1, and the steering wheel (not illustrated) are configured to be integrally movable in the axial direction with respect to the column housing 10, thereby constituting a telescopic mechanism, so that the steering wheel is capable of being adjusted to a desired position in the front-rear direction of the vehicle body. In addition, the telescopic mechanism is configured to allow a relative movement of the inner tube 21 with respect to the outer tube 22 in the axial direction (and eventually, the axial movement of the upper shaft 1 *a*) when a load equal to or larger than a predetermined value is applied to the steering shaft 1. The inner tube 21 and the outer tube 22 have a function of absorbing energy together with an annular friction material (no symbol is indicated) (e.g., a metallic elastic bushing) or the like interposed therebetween.

Figure 2:
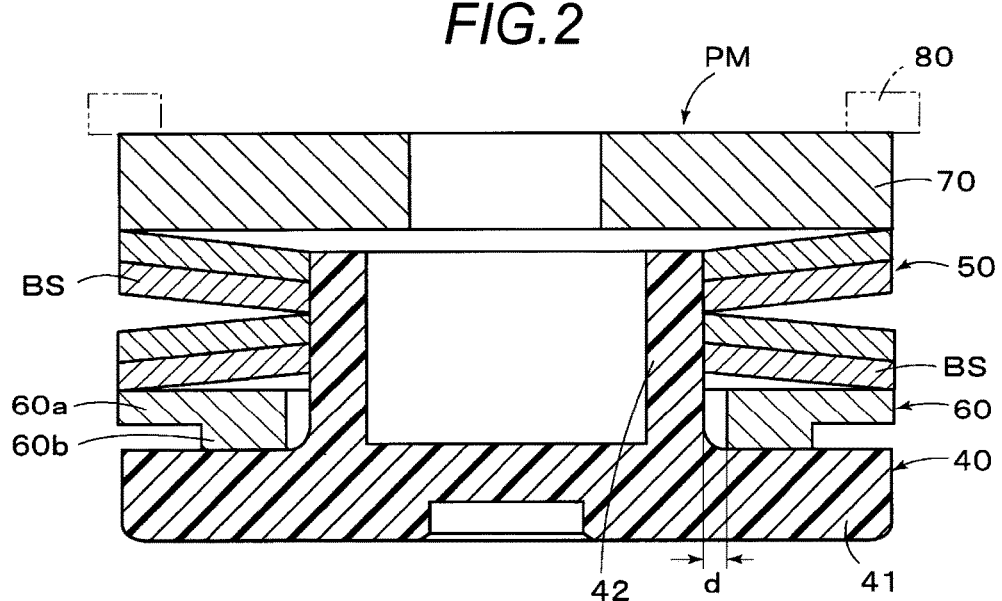
FIG. 2 is a cross-sectional view of a pressing mechanism provided in the embodiment disclosed herein in an enlarged scale.

The column housing 10 according to the embodiment includes a metallic cylindrical body like the inner tube 21 and the outer tube 22, and a pair of pressing mechanisms PM are interposed between the column housing 10 and the column tube 20 (the outer tube 22). As illustrated in FIG. 2 in an enlarged scale, each pressing mechanism PM includes an abutment member 40 made of a synthetic resin and abutting against the outer surface of the outer tube 22, a biasing member 50 interposed between the abutment member 40 and the column housing 10 and biasing the abutment member 40 in the direction toward the outer tube 22, and a shim member 60 interposed between the biasing member 50 and the abutment member 40. The shim member 60 includes a supporting portion 60*a* that abuts against the biasing member 50, and a pressing portion 60*b* that abuts against the abutment member 40 in a region shifted from the supporting portion 60*a*. Although not illustrated, a planar portion is formed in the axial direction on the outer surface of the outer tube 22, and the abutment member 40 abuts against the planar portion, so that the outer tube 22 is slidably supported.

As illustrated in FIG. 2, the abutment member 40 according to the embodiment includes a disc portion 41 that abuts against the outer surface of the outer tube 22, and a cylindrical shaft portion 42 extending from the center of the disc portion 41. The shim member 60 is a metallic annular member that has a small diameter portion that abuts against the disc portion 41 and constitutes the pressing portion 60*b*, and a large diameter portion that abuts against the biasing member 50 and constitutes the supporting portion 60*a*. A hollow portion of the shim member 60 is set to have an inner diameter at which a gap d is formed between the outer peripheral surface of the shaft portion 42 and the shim member 60. The gap d is set such that the pressing portion 60*b* may be reliably in surface-contact with the abutment member 40. The biasing member 50 is formed by superimposing a plurality of annular disc springs BS, each of which has an opening at the center thereof, and the openings of the disc springs BS are fitted on the shaft portion 42 such that the outer peripheral edge portion of a disc spring BS abuts against the outer peripheral edge portion of the shim member 60 (the peripheral edge of the supporting portion 60*a*), as illustrated in FIG. 2.

As illustrated in FIG. 2 in an enlarged scale, the biasing member 50 according to the embodiment is formed by superimposing two disc springs BS in parallel with each other and superimposing two sets of the two disc springs in series in the direction where the disc springs are fitted to the shaft portion 42. Accordingly, the shim member 60 is arranged such that the outer peripheral edge portion of the supporting portion 60*a* (the large diameter portion in FIG. 2) abuts against the biasing member 50, and the pressing portion 60*b* (the small diameter portion in FIG. 2) abuts against (in surface-contact with) the abutment member 40 in a region shifted from the supporting portion 60*a* in the radial direction.

As illustrated in FIG. 1, the pressing mechanisms PM are interposed between the column housing 10 and the outer tube 22, and are disposed such that the abutment surfaces of the abutment members 40 (the disc portions 41) abut against the planar portions (no symbol is indicated) on the outer surface of the outer tube 22. That is, holes (no symbol is indicated) that accommodate a pair of pressing mechanisms PM are formed in the column housing 10. The abutment member 40, the biasing member 50, and the shim member 60 illustrated in FIG. 2 are accommodated in each hole, and a metallic shim member 70 is disposed to support the biasing member 50 (to abut against the outer peripheral edge portion of the disc spring BS). A C-shaped snap ring 80 (indicated by a two-dot chain line in FIG. 2) is locked at an annular groove (no symbol is indicated) formed in the inner surface of each hole so that the pressing mechanism PM is held by the column housing 10, as illustrated in FIG. 1.

Thus, the outer tube 22 movable in the axial direction with respect to the column housing 10 may smoothly slide via the pressing mechanisms PM. That is, since a desired pressing load is properly applied to the outer tube 22 by the pressing mechanisms PM, it is possible to properly prevent the radial backlash of the outer tube 22, and secure the sliding property in the thrust direction. Particularly, the pressing load by the biasing member 50 is substantially evenly applied to the abutment member 40 (the disc portion 41) around the pressing portion 60*b* without being biased to the peripheral edge of the supporting portion 60*a*, and the outer tube 22 is pressed in the direction of the axial center thereof in a state where the abutment surface of the disc portion 41 abuts against (in surface-contact with) the planar portion (no symbol is indicated) of the outer tube 22. Thus, it is possible to properly prevent the radial backlash of the outer tube 22, and to smoothly move the outer tube 22 in the axial direction. The pressing mechanisms PM do not function as a mechanism of absorbing energy between the column housing 10 and the column tube 20.

Figure 3:
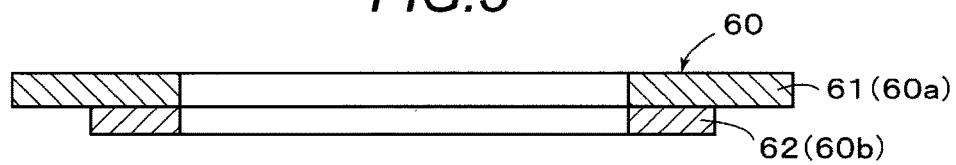
FIG. 3 is a cross-sectional view illustrating an aspect of an abutment member provided in the embodiment disclosed herein.
Figure 4:
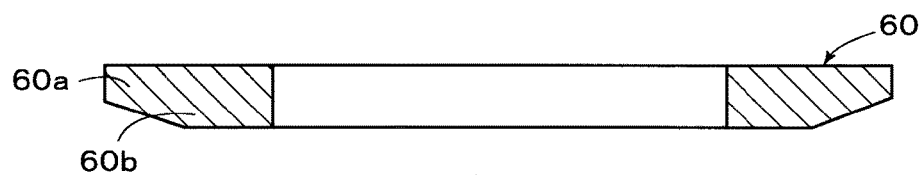
FIG. 4 is a cross-sectional view illustrating another aspect of the abutment member provided in the embodiment disclosed herein.

As illustrated in FIG. 3, in consideration of ease of assembly, the shim member 60 may be configured with two members of a first member 61 that constitutes the supporting portion 60a and a second member 62 that constitutes the pressing portion 60b. Accordingly, when the shim member 60 is assembled, it is possible to prevent the supporting portion 60a and the pressing portion 60b from being inversely arranged, thereby securing a good assemblability. Alternatively, as illustrated in FIG. 4, the shim member 60 in which the supporting portion 60a and the pressing portion 60b are integrally formed without a step therebetween may be used. According to the measurement result of a pressure distribution obtained using a pressure sensitive paper, it was confirmed that when applied to the column tube 20 via the abutment member 40 by the biasing member 50, the pressing force is substantially evenly applied to the abutment member 40 (the disc portion 41) around the pressing portion 60b without being biased to the peripheral edge of the supporting portion 60a against which the disc spring BS abuts.

Although a telescopic mechanism is not illustrated in FIG. 1, the telescopic mechanism is configured such that according to a rotational driving of a screw shaft by an electric motor supported by the column housing 10, a nut member moves in an axial direction, and the outer tube 22 (eventually, the inner tube 21, the upper shaft 1a, and the steering wheel (not illustrated)) moves in the axial direction together with the nut member. In the embodiment, an electric tilt mechanism illustrated at the lower side of FIG. 1 is disposed. However, the electric tilt mechanism is not directly related to this disclosure, and thus the explanation thereof will be omitted.

Figure 5:
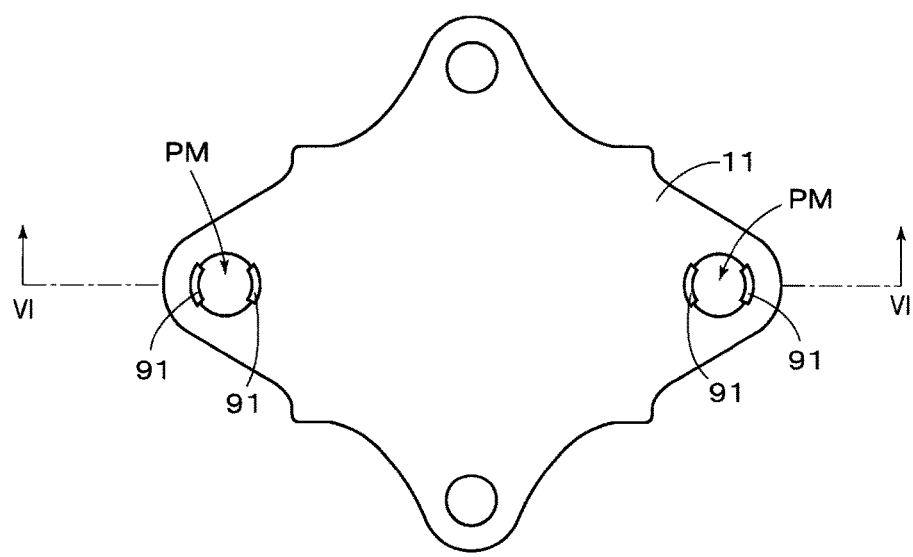
FIG. 5 is a plan view of a pressing mechanism and a plate provided in another embodiment disclosed herein.
Figure 6:
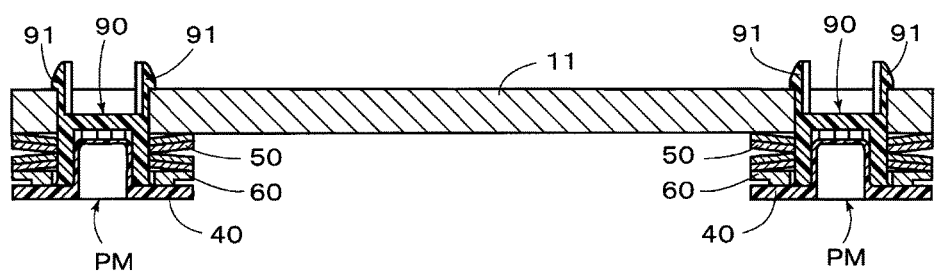
FIG. 6 is a cross-sectional view taken along line VI-VI in FIG. 5.

Regarding the support structure of the column tube 20, in the steering device where a plate 11 (corresponding to the "substrate" described in Reference 2 as described above) illustrated in FIG. 5 is screwed to the column housing 10, and the column tube 20 (the outer tube 22) is supported via the plate 11 to be movable in the axial direction, as illustrated in FIGS. 5 and 6, the pressing mechanisms PM are supported by the plate 11. In the pressing mechanisms PM provided in the embodiment, a locking member 90 including a pair of claw portions 91, 91 is joined to each of the abutment members 40 as illustrated in FIG. 6. Thus, by the pressing mechanisms PM supported by the plate 11 via the locking members 90, a desired pressing load is applied to the outer tube 22. Accordingly, as in the above described embodiment, the radial backlash of the outer tube 22 may be properly prevented.

An aspect of this disclosure is directed to a steering device of a vehicle including: a column housing supported by a vehicle body; a column tube supported to be movable with respect to the column housing in an axial direction; and a pressing mechanism interposed between the column tube and the column housing to press the column tube. The pressing mechanism includes: an abutment member that abuts against an outer surface of the column tube; a biasing member that is interposed between the abutment member and the column housing to bias the abutment member in a direction toward the column tube; and a shim member that is interposed between the biasing member and the abutment member and includes a supporting portion that abuts against the biasing member, and a pressing portion that abuts against the abutment member in a region shifted from the supporting portion.

In the steering device, the shim member may include a first member that constitutes the supporting portion, and a second member that constitutes the pressing portion.

In the steering device, the abutment member may include a disc portion that abuts against the outer surface of the column tube and a shaft portion that extends from a center of the disc portion. The shim member may include a small diameter portion that abuts against the disc portion and constitutes the pressing portion, and a large diameter portion that abuts against the biasing member and constitutes the supporting portion. The biasing member may be formed by superimposing a plurality of disc-shaped disc springs each having an opening at a center thereof, and may be disposed such that the openings of the disc springs are fitted to the shaft portion, and an outer peripheral edge portion of the corresponding disc spring abuts against the large diameter portion of the shim member. The biasing member may be formed by superimposing two disc springs in parallel with each other and superimposing two sets of the two disc springs in series in a direction where the disc springs are fitted to the shaft portion.

The steering device may further include a plate fixed to the column housing to support the column tube to be movable in the axial direction, and the pressing mechanism may be supported by the plate.

Since the aspect of this disclosure is configured as described above, the following effects are obtained. That is, in the steering device according to the aspect of this disclosure, the pressing mechanism interposed between the column tube and the column housing to press the column tube includes: an abutment member that abuts against an outer surface of the column tube; a biasing member that is interposed between the abutment member and the column housing to bias the abutment member in a direction toward the column tube; and a shim member that is interposed between the biasing member and the abutment member and includes a supporting portion that abuts against the biasing member and a pressing portion that abuts against the abutment member in a region shifted from the supporting portion. Thus, since a desired pressing load is properly applied to the column tube by the pressing mechanism, it is possible to reliably prevent the radial backlash of the column tube at a low cost.

In the steering device, when the shim member including a first member that constitutes the supporting portion and a second member constitutes the pressing portion is used, it is possible to secure a good assemblability, and to reliably apply a desired pressing load.

In the steering device, when the abutment member includes a disc portion abutting against the outer surface of the column tube and a shaft portion extending from a center of the disc portion, the shim member includes a small diameter portion that abuts against the disc portion and constitutes the pressing portion and a large diameter portion that abuts against the biasing member and constitutes the supporting portion, and the biasing member is formed by superimposing a plurality of disc-shaped disc springs each having an opening at a center thereof and disposed such that the openings of the disc springs are fitted to the shaft portion and an outer peripheral edge portion of the corresponding disc spring abuts against the large diameter portion of the shim member, a desired pressing load can be reliably applied. As the biasing member, for example, a biasing member formed by superimposing two disc springs in parallel with each other and superimposing two sets of the disc springs in series in a direction where the disc springs are fitted to the shaft portion may be used.

In the steering device including a plate fixed to the column housing to support the column tube to be movable in the axial direction, the pressing mechanism may be supported by the plate so that a desired pressing load can be reliably applied.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A steering device of a vehicle, the steering device comprising:
    a column housing supported by a vehicle body;
    a column tube supported to be movable with respect to the column housing in an axial direction; and
    a pressing mechanism interposed between the column tube and the column housing to press the column tube, wherein the pressing mechanism includes:
        an abutment member that abuts against an outer surface of the column tube;
        a biasing member that is interposed between the abutment member and the column housing so as to bias the abutment member in a biasing direction toward the column tube; and
        a shim member that is interposed between the biasing member and the abutment member and includes a supporting portion that abuts against the biasing member, and a pressing portion that abuts against the abutment member in a region of the shim member that is offset from the supporting portion of the shim member in a direction perpendicular to the biasing direction,
    wherein the abutment member includes a disc portion that abuts against the outer surface of the column tube and a shaft portion that extends from a center of the disc portion, and the shim member includes a small outer diameter portion that abuts against the disc portion and constitutes the pressing portion, and a large outer diameter portion that abuts against the biasing member and constitutes the supporting portion, and
    wherein the shim member includes a first member that constitutes the supporting portion, and a second member that constitutes the pressing portion.

2. The steering device of the vehicle according to claim 1, wherein the biasing member is formed by superimposing a plurality of disc-shaped disc springs each having an opening at a center thereof, and is disposed such that the openings of the disc springs are fitted to the shaft portion, and an outer peripheral edge portion of one of the disc springs abuts against the large outer diameter portion of the shim member.

3. The steering device of the vehicle according to claim 1, wherein the biasing member is formed by superimposing two disc springs in parallel with each other and superimposing two sets of the two disc springs in series in a direction where the disc springs are fitted to the shaft portion.

4. The steering device of the vehicle according to claim 1, further comprising a plate fixed to the column housing to support the column tube to be movable in the axial direction, wherein the pressing mechanism is supported by the plate.

5. A steering device of a vehicle, the steering device comprising:
    a column housing supported by a vehicle body;
    a column tube supported to be movable with respect to the column housing in an axial direction; and
    a pressing mechanism interposed between the column tube and the column housing to press the column tube, wherein the pressing mechanism includes:
        an abutment member that abuts against an outer surface of the column tube;
        a biasing member that is interposed between the abutment member and the column housing so as to bias the abutment member in a biasing direction toward the column tube; and
        a shim member that is interposed between the biasing member and the abutment member and includes a supporting portion that abuts against the biasing member, and a pressing portion that abuts against the abutment member in a region of the shim member that is offset from the supporting portion of the shim member in a direction perpendicular to the biasing direction,
    wherein the shim member includes a small outer diameter portion that abuts against the abutment member and constitutes the pressing portion, and a large outer diameter portion that abuts against the biasing member and constitutes the supporting portion, and
    wherein the shim member includes a first member that constitutes the supporting portion, and a second member that constitutes the pressing portion.

6. The steering device of the vehicle according to claim 5, wherein the abutment member includes a disc portion that abuts against the outer surface of the column tube and a shaft portion that extends from a center of the disc portion.

7. The steering device of the vehicle according to claim 6, wherein the biasing member is formed by superimposing two disc springs in parallel with each other and superimposing two sets of the two disc springs in series in a direction where the disc springs are fitted to the shaft portion.

8. The steering device of the vehicle according to claim 5, further comprising a plate fixed to the column housing to support the column tube to be movable in the axial direction, wherein the pressing mechanism is supported by the plate.

* * * * *